(12) United States Patent
Drumwright (10) Patent No.: US 10,580,454 B2
(45) Date of Patent: *Mar. 3, 2020

(54) METHODS SYSTEMS AND DEVICES FOR DYNAMICALLY CREATING COMPOSITE VIDEOS

(71) Applicant: LEWIS HAYES DRUMWRIGHT, San Clemente, CA (US)

(72) Inventor: Lewis Hayes Drumwright, San Clemente, CA (US)

(73) Assignee: LEWIS HAYES DRUMWRIGHT, San Clemente ( * ) Notice: Subject to any disclaimer, the term of this patent is extended or adjusted under 35 U.S.C. 154(b) by 0 days.

This patent is subject to a terminal disclaimer.

(21) Appl. No.: 16/421,096

(22) Filed: May 23, 2019

(65) Prior Publication Data

US 2019/0279682 A1    Sep. 12, 2019

Related U.S. Application Data

(63) Continuation-in-part of application No. 15/283,912, filed on Oct. 3, 2016, now Pat. No. 10,347,289, which is a continuation of application No. 15/148,889, filed on May 6, 2016, now Pat. No. 9,491,513.

(51) Int. Cl.
| | | |
|---|---|---|
| *H04N 5/93* | (2006.01) |
| *G11B 27/031* | (2006.01) |
| *H04N 21/2743* | (2011.01) |
| *H04N 21/218* | (2011.01) |
| *G11B 27/34* | (2006.01) |
| *H04N 21/8549* | (2011.01) |
| *H04N 21/81* | (2011.01) |
| *H04N 21/472* | (2011.01) |
| *H04N 21/4147* | (2011.01) |
| *H04N 21/2668* | (2011.01) |
| *H04N 21/414* | (2011.01) |
| *H04N 21/234* | (2011.01) |
| *H04N 21/4788* | (2011.01) |

(52) U.S. Cl.
CPC ............ *G11B 27/031* (2013.01); *G11B 27/34* (2013.01); *H04N 21/218* (2013.01); *H04N 21/23424* (2013.01); *H04N 21/2668* (2013.01); *H04N 21/2743* (2013.01); *H04N 21/4147* (2013.01); *H04N 21/41407* (2013.01); *H04N 21/4788* (2013.01); *H04N 21/47205* (2013.01); *H04N 21/816* (2013.01); *H04N 21/8549* (2013.01)

(58) Field of Classification Search
CPC .... G11B 27/031; G11B 27/34; H04N 21/218; H04N 21/2743; H04N 21/47205
USPC .......................... 386/278, 281, 326, 341, 353
See application file for complete search history.

(56) References Cited

U.S. PATENT DOCUMENTS

2008/0228935 A1 *   9/2008   Nam ...................... H04N 7/163
                                                                    709/231

* cited by examiner

*Primary Examiner* — Robert Chevalier
(74) *Attorney, Agent, or Firm* — Convergence Intellectual Property Law P.C.; Jonathan Garfinkel (57) ABSTRACT

Devices, systems, and methods for dynamically creating composite videos are disclosed. In one aspect a computerized method comprises receiving and playing multiple invitee recorded videos to create a seamless composite video.

20 Claims, 4 Drawing Sheets

METHODS SYSTEMS AND DEVICES FOR DYNAMICALLY CREATING COMPOSITE VIDEOS

CROSS-REFERENCES TO RELATED APPLICATIONS

This application is a continuation in part of U.S. application Ser. No. 15/283,912 filed on Oct. 3, 2016, which is a continuation of U.S. application Ser. No. 15/148,889, now U.S. Pat. No. 9,491,513, filed on May 6, 2016, the full disclosures of which are incorporated herein by reference.

FIELD OF THE INVENTION

This invention relates generally to methods, systems, and devices for dynamically creating composite videos.

DESCRIPTION OF THE RELATED ART

Creating a video with multiple participants or creators is often difficult. Scheduling a convenient time for each participant to meet may be hard. If creators individually submit content, then some participants may forget to submit their contributions. Also, statically created composite videos may be resource intensive to create and lack the ability update based on viewer reactions.

It would be desirable to provide alternative and improved methods, systems, and devices for creating composite videos. At least some of these objectives will be met by the invention described herein below.

SUMMARY OF THE INVENTION

In one aspect, the present application discloses methods, systems, and devices for dynamically creating a composite video. In one embodiment a computer-implemented method for dynamically creating a composite video comprises receiving by a user mobile computing device a selectable list of potential invitees to create and submit time bound videos for creating a composite video from a server computing device, delivering invitee selection data from the user mobile computing device to the server computing device, recording a video using a video recording component on the user mobile computing device, delivering the user recorded video from the user mobile computing device to the server computing device and delivering time period data from the user mobile computing device to the server computing device. The time period data indicates a time period to submit the time bound videos. Multiple invitee mobile computing devices then receive and play the user recorded video, record and deliver time bound videos using recording components on the invitee mobile computing devices, and display the list of invitees selected by the user mobile computing device. A composite video is then dynamically created in real-time on the multiple invitee mobile computing devices. The invitee mobile computing devices receive the composite video customization data, data indicating which invitee mobile devices did not submit a video, data indicating a video playback order, and the invitee recorded videos from the server computing device. A lead-in video is edited based on the composite video customization data, the edited lead-in video is played, the user recorded video is played after the edited lead-in video, the invitee recorded videos are played after the user recorded video in an order based on the data indicating the video playback order, a lead-out video is edited to indicate which invitees did not submit a video based on the data indicating which invitee mobile devices did not submit a video, and the edited lead-out video is played. The lead-in video and the lead-out video may be preloaded on the multiple invitee mobile computing devices in an unedited form before receiving the composite video customization data, data indicating which invitee mobile devices did not submit a video, data indicating a video playback order, and the invitee recorded videos. The multiple invitee mobile computing devices are configured to play the edited lead-in video, the user recorded video, the individual invitee recorded videos, and the edited lead-out video sequentially as a seamless composite video. In an embodiment, the invitee mobile computing devices may be configured to individually edit the unedited lead-in video while the videos are being delivered.

In an embodiment, the method comprises receiving by the at least one invitee mobile computing devices an invitation to record the invitee recorded videos; recording on the at least one invitee mobile computing devices the invitee recorded videos using a video recording component on the at least one invitee mobile computing devices; and delivering the invitee recorded videos from the at least one invitee mobile computing devices to the server computing device. The invitation to record the invitee recorded videos may be a short message service (SMS), multimedia message service (MMS), email, instant message (IM), calendar event or invite, push notification, or in-app prompt. In an embodiment, the invitation to record the invitee recorded is received by the at least one invitee mobile computing device when the at least one invitee mobile computing device is at an invited location. In various embodiments, the invitation comprises a hyperlink, access code, password, Barcode, Quick Response (QR) Code, or High Capacity Color Barcode (HCCB).

In an embodiment, the seamless composite video has a video progress bar and a time indicator representing the length of the composite video as a whole. The user recorded videos or the invitee recorded videos may be cached or buffered while the lead-in video is editing or playing. The composite video may comprise a navigation menu to skip to individual segments within the composite video.

Theme data may be delivered from the user mobile computing device to the server computing device. The multiple invitee mobile computing devices may also receive the theme data from the server computing device. The preloaded unedited lead-in video and the preloaded unedited lead-out video maybe selected based on the theme data. Customization data may comprise comprises text, image, audio, or video data. Editing the lead-in video may comprise inserting custom text, images, audio, or videos into the lead-in video.

In an embodiment, notifications are provided to the invitee mobile computing devices regarding the time period to submit the time bound videos. Notifications may be provided to the invitee mobile computing devices indicating that the composite video is available for viewing when the time period to submit the video has expired or all invitees have submitted a video.

In an embodiment, duration data indicating a maximum duration for the invitee recorded videos is delivered from the user mobile computing device to the server computing device. The invitee mobile computing devices may then receive the duration data and the time bound invitee recorded videos are limited to the maximum duration indicated in the duration data.

In an aspect, the method may comprise delivering taunt data from one of the multiple invitee mobile computing devices to the server computing device. The taunt data indicates an invitee that did not submit a video. A taunt notification is delivered from the server computing device to the invitee that did not submit a video based on the taunt data encouraging the invitee that did not submit a video to submit a video. Customization data may indicate a style for the taunt notification and the taunt notification may be created based on the indicated taunt style.

In another aspect, the method may comprise delivering positive reaction data from one of the multiple invitee mobile computing devices to the server computing device. The positive reaction data may indicate a playback time of the composite video, a location on the composite video, and an identity of the invitee mobile computing device delivering the reaction data. The positive reaction data is then delivered to at least one of the multiple invitee mobile computing devices and the composite video is edited to indicate a positive reaction by the identified invitee at the indicated playback time and the indicated location. The customization data may indicate a style for the positive reaction indication and the composite video may be edited based on the indicated positive reaction style.

In an embodiment, the method further comprises receiving by the user mobile computing device a selectable set of template question videos, delivering template question video selection data from the user mobile computing device to a feedback server computing device, editing the template question video based on customization input from the user computing device to create a customized question video, delivering the customized question video from the feedback server computing device to participant computing devices; and receiving answers to the customized question video from the participant computing devices. The participant computing devices may be the invitee mobile computing devices.

This, and further aspects of the present embodiments are set forth herein.

BRIEF DESCRIPTION OF THE DRAWINGS

Present embodiments have other advantages and features which will be more readily apparent from the following detailed description and the appended claims, when taken in conjunction with the accompanying drawings, in which:

DETAILED DESCRIPTION

While the invention has been disclosed with reference to certain embodiments, it will be understood by those skilled in the art that various changes may be made and equivalents may be substituted without departing from the scope of the invention. In addition, many modifications may be made to adapt to a particular situation or material to the teachings of the invention without departing from its scope.

Throughout the specification and claims, the following terms take the meanings explicitly associated herein unless the context clearly dictates otherwise. The meaning of "a", "an", and "the" include plural references. The meaning of "in" includes "in" and "on." Referring to the drawings, like numbers indicate like parts throughout the views. Additionally, a reference to the singular includes a reference to the plural unless otherwise stated or inconsistent with the disclosure herein.

The word "exemplary" is used herein to mean "serving as an example, instance, or illustration." Any implementation described herein as "exemplary" is not necessarily to be construed as advantageous over other implementations.

Figure 1:
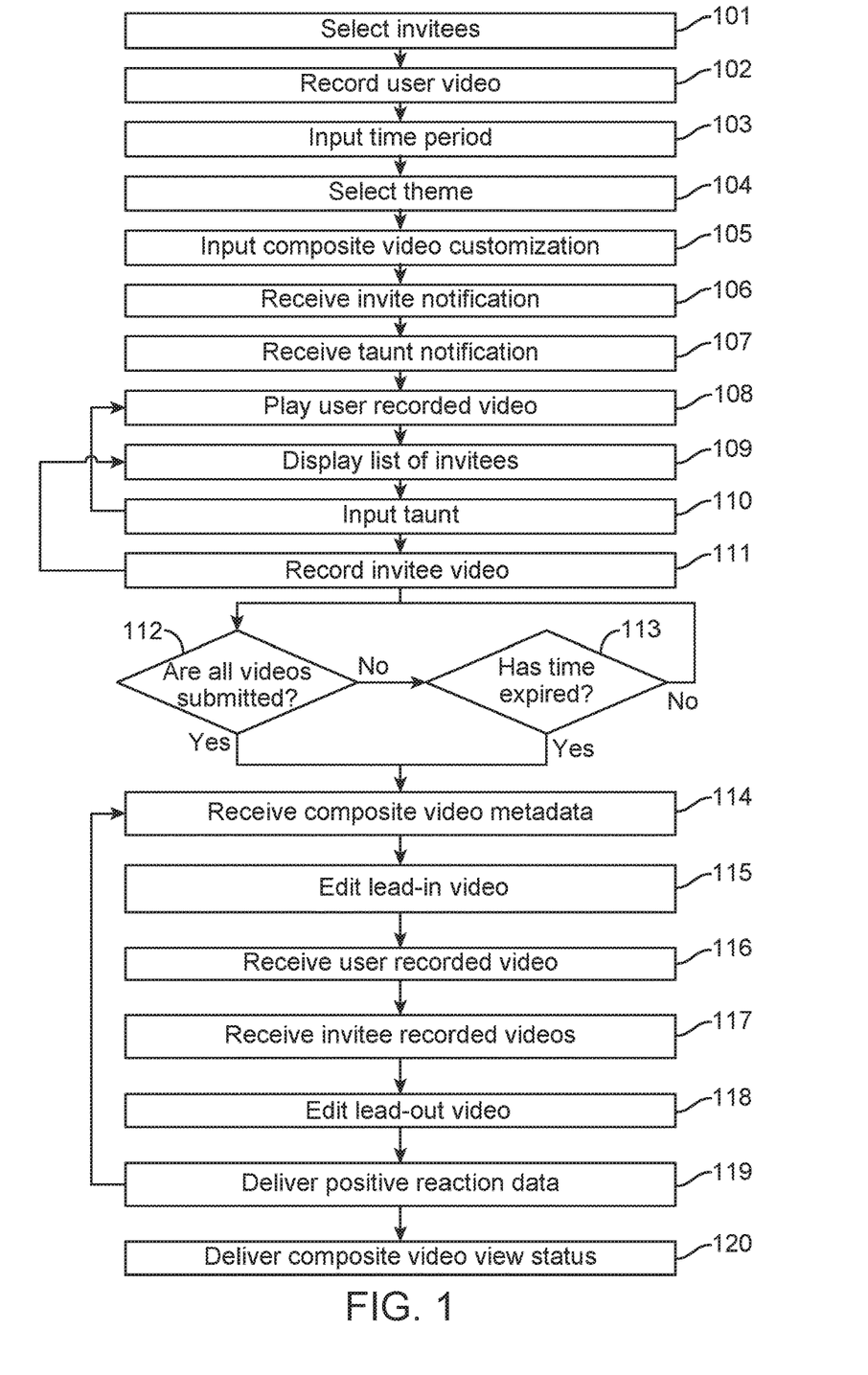
FIG. 1 shows an exemplary computer-implemented method for creating composite videos.
Figure 2:
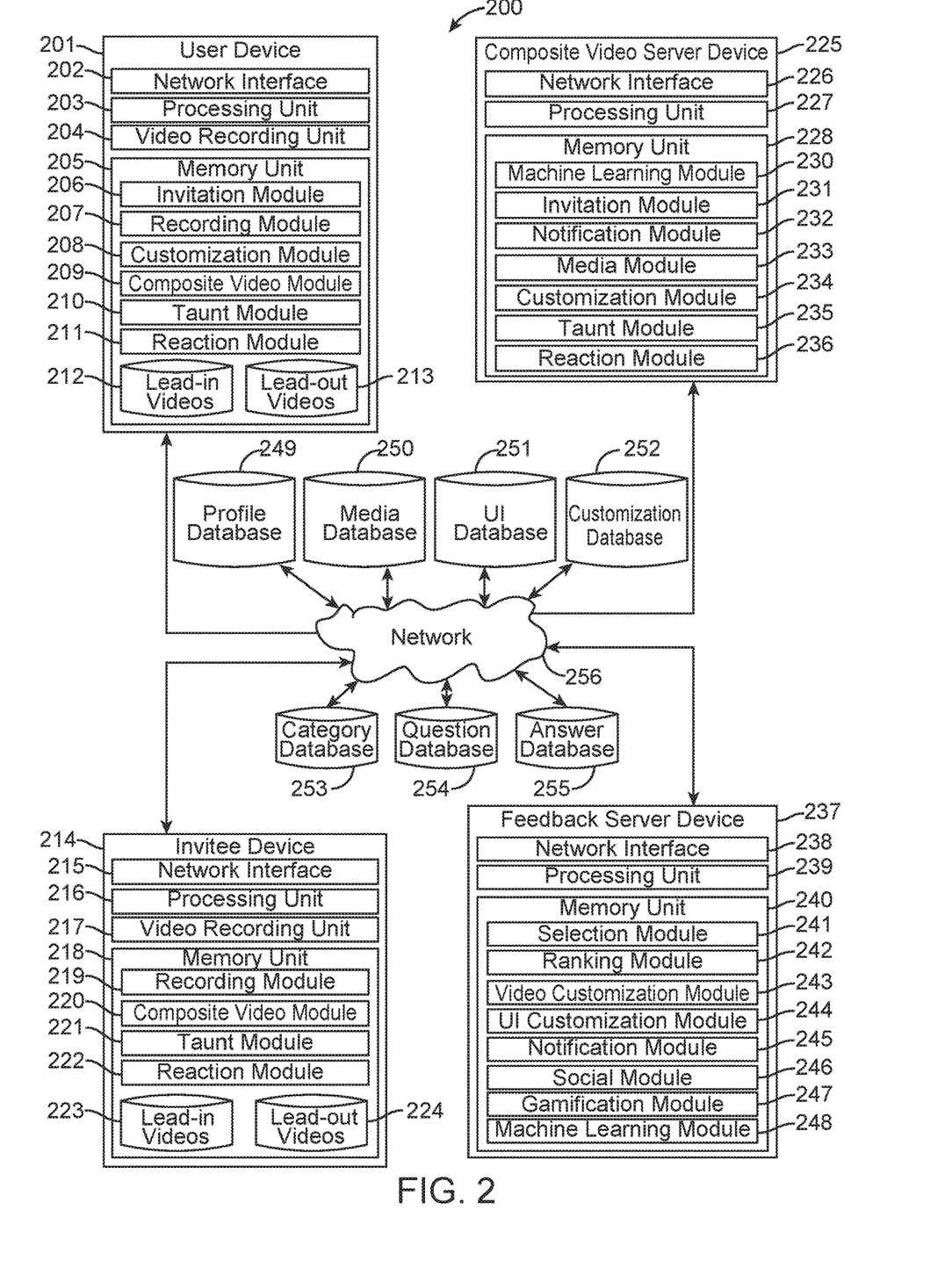
FIG. 2 shows an exemplary system architecture.

The present disclosure describes methods, systems, and devices for creating composite videos. In an embodiment, a meeting update composite video is created by combining multiple time limited update videos submitted by multiple meeting invitees. FIG. 1 shows a prescriptive computer-implemented method for creating a composite video. A corresponding exemplary system architecture is shown in FIG. 2.

Figure 3:
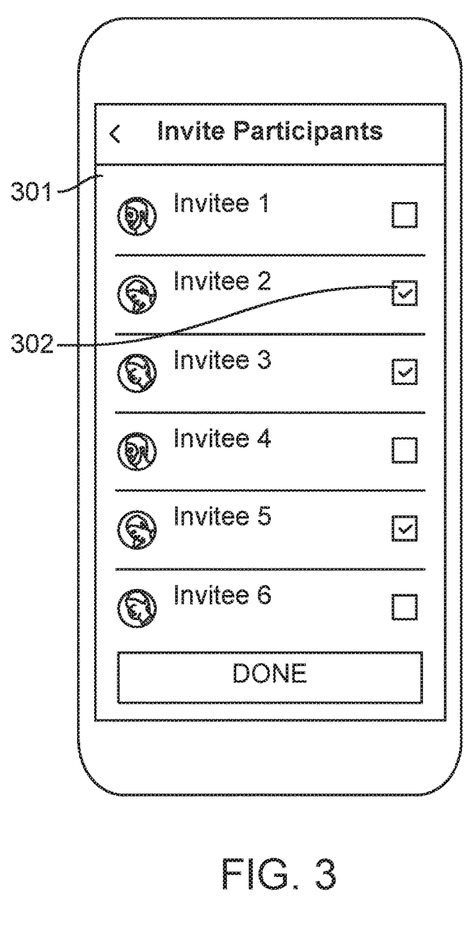
FIG. 3 shows an exemplary embodiment of participant selection.

At step 101 composite video server computing device 225 determines a list of potential invitees to record and submit time bound videos for the creation of a composite video and delivers the list to a user mobile computing device 201. In an embodiment, composite video server computing device 225 may use machine learning to determine or rank the list of potential invitees. Machine learning may be based on previous interactions with potential invitees, roles of potential invitees, social networking, previous composite videos, composite video submissions, feedback, taunt data, location data, app usage, etc. After the list of potential invitees is received by the user mobile computing device 201, invitees are selected on the user mobile computing device 201 and the invitee selection data is delivered to the composite video server computing device 225. An exemplary user interface for selecting invitees is shown if FIG. 3. A list of potential participants 301 is provided on the user mobile computing device 201 and individual invitees are selected 302. The user interface in FIG. 3 is merely an example. Other user interfaces may be used. While specific invitees or groups of invitees may be selected, in various embodiments shareable hyperlinks, codes, and/or passwords may be created wherein anyone with the hyperlink, code, and/or password is invited to create a video. In an embodiment invitees may be invited based on location. In another embodiment, potential invitees may request an invitation.

Optionally, at step 102 a video is recorded on the user mobile computing device 201 using a video recording unit 204 on the user mobile computing device 201. The user recorded video may be time bound or have no duration limitation. Time bound user submitted videos may have the same, longer, or shorter duration limits than invitee submitted videos. The user recorded video is then delivered to the composite video server computing device 225. The user recorded video may be stored in a media database 250.

At step 103 a time period to submit a video for use in the creation of the composite video is input and the time period data is delivered to the composite video server computing device 225. Time period data may be stored in a customization database 245. Optionally, maximum video duration may be entered on the user mobile computing device 201 and delivered to the composite video server computing device 225. Maximum durations may be set for individual invitee submitted videos. A maximum duration may also be set for the composite video. Duration data may be stored in a customization database 245. Optionally, limits on the number of invitee submitted videos may be entered on the user mobile computing device 201 and delivered to the composite video server computing device 225. In an embodiment, a maximum total number of invitee submitted videos may be set. A maximum number of submissions per invitee may also be set. Additionally or alternatively, a maximum number of invitee submitted videos submitted per hour, day, week, month, or any other period of time, may be set. Maximum video submission data may be stored in a customization database 245.

At step 104 composite video server computing device 225 determines a list of themes and delivers the list to the user mobile computing device 201. In an embodiment, composite video server computing device 225 may use machine learning to determine or rank the list of themes. Machine learning may be based on previous interactions with potential invitees, roles of potential invitees, social networking, previous composite videos, video submissions, feedback, taunt data, location data, app usage data, etc. After the list of themes is received by the user mobile computing device 201, a theme is selected on the user mobile computing device 201 and the theme selection data is delivered to the composite video server computing device 225. Theme selection data may be stored in a customization database 245. Themes may include data relating to lead-in videos, lead-out videos, images, text, video, fonts, positive or negative reaction indicators, user interfaces, etc. Themes may comprise customizable template lead-in videos and template lead-out videos.

At step 105 composite video customization data is input on the user mobile computing device 201 and delivered to the composite video server computing device 225. Customization data may be stored in a customization database 245. Customization data may comprise video titles, subjects, text intros or prompts, dates, times, participants, images, audio, video, backgrounds, colors, logos, icons, positive or negative reaction indicators, user interface elements, whether to include a lead-in video, whether to include a lead-out video, etc. In an embodiment an option to include or not include lead-in videos and/or lead-out videos is selected on the user mobile computing device 201. Customizations may be suggested by the composite video server computing device 225. Machine learning may be used to improve suggested customizations.

While steps 101 through 105 are depicted in a given order, any or all of these steps may take place in any order. Additionally, any or all of steps 101 through 105 may be performed sequentially or in parallel. Further, any or all of steps 101 through 105 may be skipped.

At step 106 an invitation notification or alert may be sent to each invitee mobile computing device 214 based on the invitee selection data from step 101. The notification indicates that the invitee has been invited to record a video to be used in creating a composite video. The notification may comprise various data relating to the composite video such as titles, date of request, period to submit a video, maximum number of submissions, subject of the video, requester, invitees, text intros or prompts, etc. Notifications and alerts may be in the form of short message services (SMS), multimedia message services (MMS), email, instant messages (IM), calendar events or invites, push notifications, in-app prompts, or the like. Notifications or alerts may contain a required hyperlink and/or code to submit a video. In an embodiment, notifications or alerts may contain Barcode data, Quick Response (QR) Code data, High Capacity Color Barcode (HCCB), and the like, used to access the video submission process. In an embodiment, invitees receive a notification when arriving at an invited location. Alternatively, invitees may receive a location based invite when opening the app at an invited location.

At step 107 invitee mobile computing devices 214 may receive further notifications or taunts from other invitee mobile computing devices 214 or the user mobile computing device 201 encouraging the invitee mobile computing device 214 to submit a video. Taunt notifications may be received at any point up until the invitee mobile computing device 214 submits the video.

Optionally, if a video was recorded and submitted by the user mobile computing device 201, at step 108, invitee mobile computing devices 214 receive and play the video recorded and submitted by the user mobile computing device 201. In an embodiment, the user submitted video is streamed from the composite video server computing device 225. In various embodiments, the user submitted video may be cached on the invitee mobile computing devices 214 for later use in creating the composite video.

Figure 4:
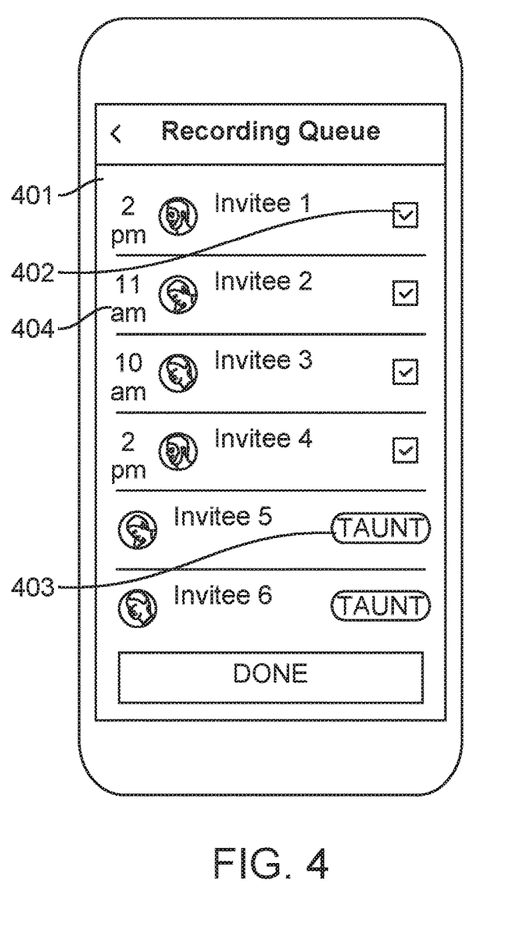
FIG. 4 depicts an exemplary embodiment showing video segment recording status.

At step 109 a list of invitees may be displayed on the invitee mobile computing devices 214. An exemplary embodiment is show in FIG. 4. The user interface in FIG. 4 is merely an example. Other user interfaces may be used. Invitee list 401 may indicate each invitee, whether the invitee has submitted a video 402, a time or date of submission of the video 404, information relating to the invitee, etc. In an embodiment, invitee mobile computing devices 214 and/or user mobile computing device 201 may see whether an invitee has submitted a video but cannot view the submitted videos before all invitees have submitted a video or the time period for submitting a video has expired.

At step 110, invitee mobile computing devices 214 may send 403 taunt notifications to other invitees that have not submitted a video encouraging the invitee to record and submit a video. Taunt data is sent form the invitee mobile computing device 214 to the composite video server computing device 225. A taunt notification is then sent from the composite video server computing device 225 to the identified invitee mobile computing device 214 in step 107.

At step 111 a video is recorded on the invitee mobile computing device 214 using a video recording unit 215 on the invitee mobile computing device 214. The invitee recorded video may be time bound or have no duration limitation. Time bound invitee submitted videos may have the same, longer, or shorter duration limits than the user submitted video. In an embodiment, the invitee mobile computing device receives duration data from the composite video server device indicating a maximum duration for the invitee recorded video. The invitee recorded video is then delivered to the composite video server computing device 225. The invitee recorded video may be stored in the media database 243. The list of invitees in step 108 is then updated to indicate that the invitee mobile computing device 214 has submitted a video. In an embodiment, invitee mobile computing devices 214 may submit multiple videos.

While steps 107 through 111 are depicted in a given order, any or all of these steps may take place in any order. Additionally, any or all of steps 108 through 111 may be performed sequentially or in parallel. Further, any or all of steps 108 through 111 may be skipped.

At step 112 the composite video server computing device 225 determines whether all the invitee mobile computing devices 214 have submitted a video. If all videos have been submitted, then a notification is sent to the user mobile computing device 201 and all invitee mobile computing devices 214 indicating that the composite video is available for viewing. If any of the videos have not been submitted, then the composite video server computing device 225 determines whether the time period for submitting a video has expired at step 113. In an embodiment, the composite video server computing device 225 may determine whether the maximum number videos has been submitted and/or if maximum duration of the composite video has been reached. While step 112 is depicted as occurring before step 113, alternatively step 113 may be performed before step 112. Steps 112 and 113 may be repeated until all videos have been submitted, the time period for submission has expired, or the maximum number of videos has been submitted. At this point, composite video server computing device 225 delivers the notification indicating that the composite video is available for viewing to the user mobile computing device 201 and/or all invitee mobile computing devices 214. Optionally, invitee submitted videos may be selected for inclusion in the composite video and/or a playback order may be selected on the user mobile computing device 201. In an embodiment, composite video server computing device 225 may use machine learning to determine invitee submitted videos for inclusion and/or a playback order. Machine learning may be based on previous interactions with potential invitees, roles of potential invitees, social networking, previous composite videos, composite video submissions, feedback, taunt data, location data, app usage, etc. In an embodiment, the composite video then becomes available for creation and viewing.

In steps 114 through 119 creation and playback of a composite video takes place individually on invitee mobile computing devices. In an embodiment, videos may be streamed, edited, and played in real-time to create a seamless composite video.

At step 114 invitee mobile computing device receives composite video metadata. Composite video metadata may include theme selection data, composite video customization data, video submission data, playback order data, and/or positive reaction data.

Optionally, at step 115 a template lead-in video 223 in an unedited form is edited on the invitee mobile computing device 214 based on the customization data and an edited version of the lead-in video is played. Editing of the lead-in video may include overlaying text such as titles, dates, subjects, inserting audio, overlaying images or icons, changing backgrounds or colors, inserting or overlaying video, or the like. Unedited template lead-in videos 223 may be preloaded on invitee mobile computing devices 214 before submission of all videos so that editing and playback of the lead-in video can take place immediately without the need to stream the videos. Editing of the lead-in video may take place in real-time during playback of the video. Other video segments used to create the composite video may cache or buffer while the lead-in video is edited or played.

Optionally, if a video was recorded and submitted by the user mobile computing device 201, at step 116, the user recorded video may be played on the invitee mobile computing device 214. If an edited lead-in video was created, the user recorded video may be played on the invitee mobile computing device 214 after the edited lead-in video. In an embodiment, the user video may have been cached on the invitee mobile computing device 214 at step 108. In an alternative embodiment, the user recorded video may be restreamed to the invitee mobile computing device 214. Caching or buffering of the user recorded video may begin during editing or playback of the lead-in video. The user recorded video may be edited to indicate positive or negative reactions based on reaction data from previous viewers.

At step 117 invitee recorded videos are streamed and played on the invitee mobile computing devices 214. Caching of the invitee recorded videos may begin during editing or playback of the lead-in video, playback of the user recorded video, playback of any previous invitee recorded video, or the submission period. Invitee recorded videos are played sequentially after the user recorded video in an order specified in the playback order data. Playback order may be based on submission date, invitee name, subject matter of the video, role of the invitee, previous submissions, social networking, location data, an order specified by the user, etc. Invitee recorded videos may be edited to indicate positive or negative reactions based on reaction data from previous viewers.

Optionally, at step 118 a template lead-out video in an unedited form is edited on the invitee mobile computing device 214 based on the customization data and the submission data and an edited version of the lead-out video is played after the invitee recorded videos. Editing of the lead-out video may include overlaying text, inserting audio, overlaying images or icons, changing backgrounds or colors, inserting or overlaying video, or the like. In an embodiment, lead-out videos are edited to overlay the names of invitees that did not submit a video. Unedited template lead-out videos may be preloaded on invitee mobile computing devices 214 before submission of all videos so that editing and playback of the lead-out video can take place immediately without the need to stream the videos. In an embodiment, editing of the lead-out video may be performed while lead-in video, user video, or invitee videos are edited or played. In another embodiment, editing of the lead-out video takes place in real-time during playback of the video.

Figure 5:
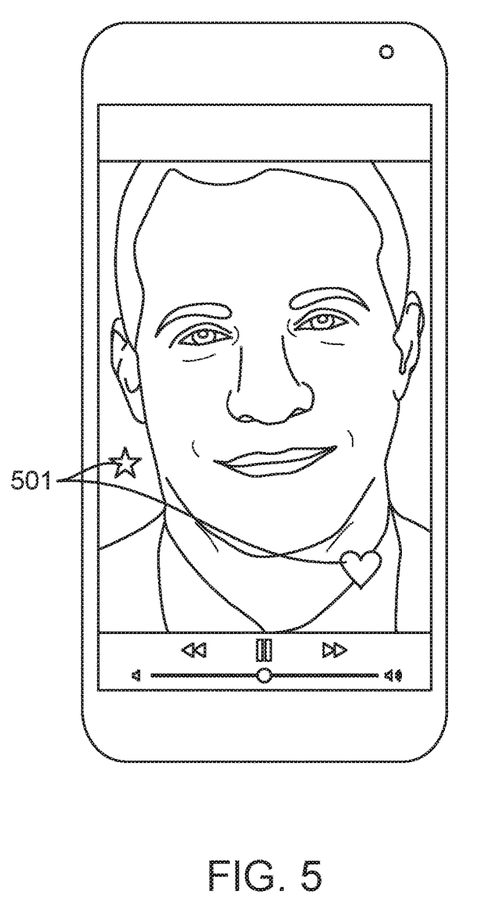
FIG. 5 shows an exemplary embodiment of a composite video with reaction indicators.

During playback of the user recorded video, any of the invitee recorded videos, the lead-in video, or the lead-out video, viewers may input positive or negative feedback. Positive or negative feedback may indicate the identity of the viewer, the time period of the video, and a specific location on the video. In an embodiment, pressing on the screen of the invitee mobile computing device while the video is playing registers a positive or negative response at the location pressed and the playback time of the video. At step 119 positive or negative reaction data is delivered to the composite video server computing device. Reaction data will be delivered to any later viewers of the composite video. The composite videos will then be edited to overlay a visual indicator of the positive or negative feedback at a specific location on the screen, at a specific time in the video, and by a specific viewer. FIG. 5 depicts an embodiment of a composite video with indicators 501 of positive reactions by multiple viewers at a specific time in the video and different locations on the screen. The user interface in FIG. 5 is merely an example. Other user interfaces may be used.

Figure 6:
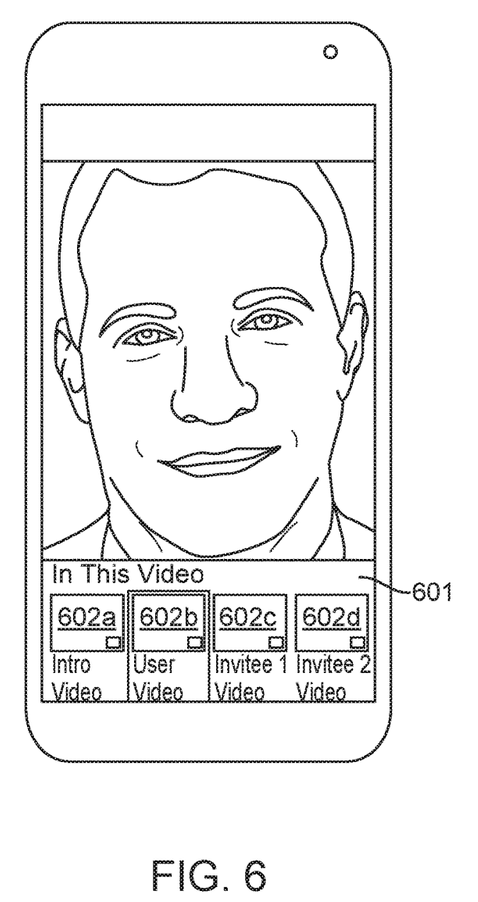
FIG. 6 depicts an exemplary embodiment of a video segment navigation menu.

In steps 114 through 118 the edited lead-in video, the user recorded video, the individual invitee recorded videos, and the edited lead-out video are played sequentially as a seamless composite video without breaks, pauses, or loading between individual video segments. In various embodiments, the seamless composite video may be played with or without the edited lead-in video, the user recorded video, and/or the edited lead-out video. In an embodiment, the composite video appears as a single video with video progress bar, current time, remaining time, and/or total time elements representing the length of the composite video as a whole. Playback of the composite video may be paused, fast-forwarded, or rewound. In an embodiment, long pressing on the screen fast-forwards the composite video. A video segment navigation menu may be present to navigate to individual video segments used in the composite video. FIG. 6 depicts an exemplary embodiment of a video segment navigation menu. In an embodiment, swiping up on the screen brings up a navigation menu 601 with each of the video segments used to create the composite video. Clicking on a segment skips the composite video to the relevant section. The user interface in FIG. 5 is merely an example. Other user interfaces may be used.

At step 120 view status data may be delivered to the composite video server computing device indicating that the composite video has been viewed by the viewing device. In an embodiment, composite video view status for the user and/or invitees can be viewed on the user mobile computing device 201 or the invitee mobile computing devices 214. While steps 114 through 120 have been described as occurring on invitee mobile computing devices 214, these steps may also occur on the user mobile computing device 201.

Notifications and alerts may be sent to the user mobile computing devices 201 or invitee mobile computing devices 214 using short message service (SMS), multimedia message services (MMS), email, instant message (IM), calendar events or invites, mobile notifications, in-app notifications, or the like. Notifications may be provided regarding invitations to submit a video, encouragement to submit a video, viewing of a video by others, positive or negative reactions by other viewers, time remaining to submit a video, submission of a video by others, and/or availability of a composite video for viewing.

In various embodiments, users and invitees may create custom themes, templates, user interfaces, text, images, audio clips, video clips, characters, themes, settings, objects, color schemes, layouts, etc. User submitted content may then be used in the creation of future composite videos. Gamification, points, awards, and rewards may be used to encourage user creation and submission of content for future use.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus or system for performing the operations herein. This apparatus or system may be specially constructed for the required purposes, and/or it may comprise a general-purpose computing device selectively activated or reconfigured by a computer program stored in a computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

FIG. 2 illustrates an exemplary system architecture according to one embodiment. The system 200 may comprise one or more user mobile computing devices 201, one or more invitee mobile computing devices 214, one or more composite video server computing devices 225, and one or more feedback server computing devices 237. The computing devices 201, 214, 225, 237 are configured to communicate over the network 256.

Computing devices 201, 214, 225, 237 may comprise various components including but not limited to one or more processing units 203, 216, 227, 239, memory units 205, 218, 228, 240, video or display interfaces, network interfaces 202, 215, 226, 238, input/output interfaces, video recording units 204, 217, and buses that connect the various units and interfaces. The network interfaces 202, 215, 226, 238 enable the computing devices 201, 214, 225, 237 to connect to the network 256 The memory units 205, 218, 228, 240 may comprise random access memory (RAM), read only memory (ROM), electronic erasable programmable read-only memory (EEPROM), and basic input/output system (BIOS). The memory units 205, 218, 228, 240 may further comprise other storage units such as non-volatile storage including magnetic disk drives, optical drives, flash memory and the like.

While FIG. 2 depicts one user mobile computing device 201, one invitee mobile computing device 214, one composite video server computing device 225, one feedback server computing device 237, seven databases 249, 250, 251, 252, 253, 254, 255, and one network 256, this is meant as merely exemplary. Alternatively, any number of computing devices 201, 214, 225, 237, databases 249, 250, 251, 252, 253, 254, 255, or networks 256 may be present. Some or all of the components of the computing devices 201, 214, 225, 237 and/or the databases 249, 250, 251, 252, 253, 254, 255 may be combined into a single component. Likewise, some or all of the components of the computing devices 201, 214, 225, 237 and/or the databases 242, 243, 244, 245, 246, 247, 248 may be separated into distinct components connected through the network 256.

Server computing devices 225, 237 are shown communicating with databases 249, 250, 251, 252, 253, 254, 255 over network 256. Alternatively, any or all of the databases may be located on the server computing devices 225, 237.

The modules of computing devices 201, 214, 225, 237 may be implemented as software code to be executed by a processing unit 203, 216, 227, 239 using any suitable computer language. The software code may be stored as a series of instructions or commands in a memory unit 205, 218, 228, 240. While specific modules are shown as part of specific computing devices 201, 214, 225, 237, modules may additionally or alternatively be integrated into any of the other computing devices 201, 214, 225, 237.

User mobile computing device 201 may comprise an invitation module 206, a recording module 207, a customization module 208, a composite video module 209, a taunt module 210, and a reaction module 211. User mobile computing device 201 may comprise locally cached template lead-in videos 212 and template lead-out videos 213.

Invitee mobile computing devices 214 may comprise a recording module 219, a composite video module 220, a taunt module 221, and a reaction module 222. Invitee mobile computing devices 214 are depicted as having different modules than the user mobile computing device 201. Alternatively, invitee mobile computing devices 214 may comprise the same modules as the user mobile computing device 201. Invitee mobile computing devices 214 may comprise locally cached template lead-in videos 223 and template lead-out videos 224.

Composite video server computing device 225 may comprise an invitation module 231, a notification module 232, a media module 233, a customization module 234, a taunt module 235, a reaction module 236, and a machine learning module 230.

System 200 may incorporate a feedback server computing device 237 configured to elicit feedback to identify and solve enterprise problems. Methods, systems, and devices for eliciting feedback have been described in U.S. patent application Ser. No. 14/871,793, the full disclosure of which is incorporated by reference. Feedback server computing device 237 may comprise a selection module 241, a ranking module 242, a video customization module 243, a UI customization module 244, a notification module 245, a social module 246, a gamification module 247, and a machine learning module 248.

In an embodiment, composite video creation may be integrated with feedback sessions. A feedback session may be launched as a result of a composite video. In an embodiment, feedback sessions may be launched to solve an issue discussed in a composite video. Problem categories, challenge questions, template question videos, template user interfaces, answers, solution questions, template solution videos, or template video customization may be determined or suggested based on the composite video. Feedback session may also use a composite video or portions of a composite video as a video segment for customizing a template question/solution video, as a template question/solution video, or as a question/solution video. Additionally or alternatively, creation of a composite video may be launched as a result of a feedback session. In an embodiment, a composite video may be created to discuss an issue from a feedback session. Videos from a feedback session may be used to create any portion of the composite video. Composite video server computing device 225 and feedback server computing device 237 may share the same profile database 249. In an embodiment, feedback session creators or participants may be the same as or be determined based on composite video users, invitees, or viewers. Likewise, composite video creation users, invitees, or viewers may be the same as or be determined based on feedback session creators or participants.

System 200 may comprise one or more profile databases 249 containing data relating to users, invitees, employees, and potential participants, one or more media databases 250 containing data relating to user recorded videos, invitee recorded videos, template lead-in videos, template lead-out videos, template question videos, template solution videos, customized videos, and video customization media, one or more UI databases 251 containing data relating to template user interfaces, customized user interfaces, and user interface customization media, one or more customization databases 252 containing video customization data, video metadata, video playback order data, reaction data, time period data, and duration data, one or more category databases 253 containing data relating to problem categories, one or more question databases 254 containing data relating to challenge questions, and one or more answer databases 255 containing data relating to answers to the question videos and solution videos.

Invitation modules 206, 231 are configured to suggest and select invitees to create and submit videos for the creation of a composite video. Recording modules 207, 219 are configured to record videos using video recording units 204, 217 and deliver recorded videos to the composite video server computing device 225. Customization modules 208, 234 may be configured to suggest composite video themes, select composite video themes, suggest composite video customization, and input and deliver composite video customization data. Composite video modules 209, 220 are configured to edit video segments and play video segments as a seamless composite video. Taunt modules 210, 221, 235 are configured to send and receive taunt data. Reaction modules 211, 222, 236 are configured to send and receive positive and negative reaction data relating to the composite videos. Notification module 232, 245 may be configured to provide notifications through SMS, MMS, email, IM, calendar events or invites, mobile notifications, in-app notifications, or the like. Notifications may be push or pull notifications. Social module 246 is configured to determine and track social networking relationships. Medial module 233 may be configured to send and receive videos between media database 250 and computing devices 201, 214, 225, 237. Machine learning modules 230, 248 may connect to databases 249, 250, 251, 252, 253, 254, 255 and may be configured to improve any of the functions or modules of the system 200 through machine learning.

Selection module 241 may be configured to determine lists of problem categories, lists of challenge questions within the selected problem category, sets of template question videos, lists of answers, sets of solution template videos, or sets of template user interface skins. Ranking module 242 may be configured to process votes, likes, dislikes, ratings, or comments. Ranking module 242 may also be configured to rank, sort, or filter answers. Video customization module 243 is configured customize template question videos and template answer videos. UI customization module 244 is configured customize template user interfaces. Gamification module 247 may be configured to calculate, assign, and track points, prizes, awards, rewards, leaderboards, top ideas, tasks and/or challenges.

The various components depicted in FIG. 2 may comprise computing devices or reside on computing devices such as servers, desktop computers, laptop computers, tablet computers, personal digital assistants (PDA), smartphones, mobile phones, smart devices, appliances, sensors, or the like. Computing devices may comprise processors, memories, network interfaces, peripheral interfaces, and the like. Some or all of the components may comprise or reside on separate computing devices. Some or all of the components depicted may comprise or reside on the same computing device.

The various components in FIG. 2 may be configured to communicate directly or indirectly with a wireless network such as through a base station, a router, switch, or other computing devices. In an embodiment, the components may be configured to utilize various communication protocols such as Global System for Mobile Communications (GSM), General Packet Radio Services (GPRS), Enhanced Data GSM Environment (EDGE), Code Division Multiple Access (CDMA), Wideband Code Division Multiple Access (WCDMA), Bluetooth, High Speed Packet Access (HSPA), Long Term Evolution (LTE), and Worldwide Interoperability for Microwave Access (WiMAX).

The components may be further configured to utilize user datagram protocol (UDP), transport control protocol (TCP), Wi-Fi, satellite links and various other communication protocols, technologies, or methods. Additionally, the components may be configured to connect to an electronic network without communicating through a wireless network. The components may be configured to utilize analog telephone lines (dial-up connection), digital lines (T1, T2, T3, T4, or the like), Digital Subscriber lines (DSL), Ethernet, or the like. It is further contemplated that the components may be connected directly to a computing device through a USB port, Bluetooth, infrared (IR), Firewire port, thunderbolt port, ad-hoc wireless connection, or the like. Components may be configured to send, receive, and/or manage messages such as email, SMS, IM, MMS, or the like.

While the above is a complete description of the preferred embodiments of the invention, various alternatives, modifications, and equivalents may be used. Therefore, the above description should not be taken as limiting the scope of the invention which is defined by the appended claims.

What is claimed is:

1. A computer-implemented method for dynamically creating a composite video comprising:
dynamically creating and playing a composite video in real-time on at least one of multiple invitee mobile computing device, wherein dynamically creating and playing the composite video comprises:
receiving by the at least one invitee mobile computing device composite video customization data;
receiving by the at least one invitee mobile computing device data indicating a video playback order from the server computing device;
receiving by the at least one invitee mobile computing device invitee recorded videos individually from the server computing device; and
playing on the at least one invitee mobile computing device the invitee recorded videos in an order based on the data indicating the video playback order;
wherein the at least one invitee mobile computing device is configured to play the individual invitee recorded videos as a seamless composite video.

2. The method of claim 1, further comprising:
receiving by the at least one invitee mobile computing devices an invitation to record the invitee recorded videos;
recording on the at least one invitee mobile computing devices the invitee recorded videos using a video recording component on the at least one invitee mobile computing devices; and
delivering the invitee recorded videos from the at least one invitee mobile computing devices to the server computing device.

3. The method of claim 2, wherein the invitation to record the invitee recorded videos is a short message service (SMS), multimedia message service (MMS), email, instant message (IM), calendar event or invite, push notification, or in-app prompt.

4. The method of claim 3 wherein the invitation to record the invitee recorded is received by the at least one invitee mobile computing device when the at least one invitee mobile computing device is at an invited location.

5. The method of claim 2, wherein the invitation comprises a hyperlink, access code, password, Barcode, Quick Response (QR) Code, or High Capacity Color Barcode (HCCB).

6. The method of claim 1, further comprising:
receiving by the at least one invitee mobile computing device a user recorded video; and
playing on the at least one invitee mobile computing device the user recorded video before the invitee recorded videos;
wherein the at least one invitee mobile computing device is configured to play the user recorded video and the individual invitee recorded videos as a seamless composite video.

7. The method of claim 1, further comprising:
editing by the at least one invitee mobile computing device a lead-in video based on the received composite video customization data; and
playing on the at least one invitee mobile computing device the edited lead-in video before the invitee recorded videos;
wherein the at least one invitee mobile computing device is configured to play the edited lead-in video and the individual invitee recorded videos as a seamless composite video.

8. The method of claim 7, wherein the lead-in video is preloaded on the at least one invitee mobile computing device in an unedited form before receiving the composite video customization data, data indicating a video playback order, and the invitee recorded videos, and wherein the invitee mobile computing devices are configured to individually edit the unedited lead-in video while the videos are being delivered.

9. The method of claim 1, further comprising:
receiving by the at least one invitee mobile computing device data indicating which invitee mobile devices did not submit a video from a server computing device;
editing by the at least one invitee mobile computing device a lead-out video to indicate which invitees did not submit a video based on the data indicating which invitee mobile devices did not submit a video; and
playing on the at least one invitee mobile computing device the edited lead-out video after the invitee recorded videos;
wherein the at least one invitee mobile computing device is configured to play the individual invitee recorded videos, and the edited lead-out video sequentially as a seamless composite video.

10. The method of claim 9, wherein the lead-out video is preloaded on the at least one invitee mobile computing device in an unedited form before receiving the composite video customization data, data indicating which invitee mobile devices did not submit a video, data indicating a video playback order, and the invitee recorded videos.

11. The method of claim 1, further comprising:
recording on the at least one invitee mobile computing device the invitee recorded videos using a video recording component on the at least one invitee mobile computing device; and
delivering the invitee recorded videos from the at least one invitee mobile computing device to the server computing device.

12. The method of claim 1, further comprising providing a notification to the at least one invitee mobile computing device regarding a time period to submit the invitee recorded videos.

13. The method of claim 1, further comprising providing a notification to the at least one invitee mobile computing device when a time period to submit the invitee recorded videos has expired indicating that the composite video is available for viewing.

14. The method of claim 1, further comprising providing a notification to the at least one invitee mobile computing device after all invitees have submitted a video indicating that the composite video is available for viewing.

15. The method of claim 1, further comprising providing a notification to the at least one invitee mobile computing device regarding a maximum number of invitee recorded videos.

16. The method of claim 1, further comprising providing a notification to the at least one invitee mobile computing device when a maximum number of invitee recorded videos have been submitted indicating that the composite video is available for viewing.

17. The method of claim 1, further comprising delivering positive reaction data from one of the at least one invitee mobile computing device to the server computing device, wherein the positive reaction data indicates a playback time of the composite video, a location on the composite video, and an identity of the invitee mobile computing device delivering the positive reaction data;

delivering the positive reaction data to at least one of the at least one invitee mobile computing device; and editing the composite video on the at least one of the at least one invitee mobile computing device to indicate a positive reaction by the identified invitee at the indicated playback time and the indicated location.

18. The method of claim 17, wherein the customization data indicates a style for the positive reaction indication, and the composite video is edited based on the indicated positive reaction style.

19. The method of claim 1, wherein the seamless composite video has a video progress bar and a time indicator representing the length of the composite video as a whole.

20. The method of claim 7, wherein the invitee recorded videos are cached or buffered while the lead-in video is editing or playing.

* * * * *